United States Patent
Kanz et al.

(10) Patent No.: US 7,389,802 B2
(45) Date of Patent: Jun. 24, 2008

(54) TIRE WITH DOUBLE LAYER INNERLINER

(75) Inventors: Carlo Kanz, Mamer (LU); Uwe Frank, St. Wendel (DE)

(73) Assignee: The Goodyear Tire & Rubber Co., Akron, OH (US)

( * ) Notice: Subject to any disclaimer, the term of this patent is extended or adjusted under 35 U.S.C. 154(b) by 312 days.

(21) Appl. No.: 11/027,409

(22) Filed: Dec. 30, 2004

(65) Prior Publication Data

US 2006/0144496 A1    Jul. 6, 2006

(51) Int. Cl.
*B60C 5/14* (2006.01)
*B29D 30/06* (2006.01)

(52) U.S. Cl. ............... 152/510; 156/79; 156/123; 156/253; 521/918

(58) Field of Classification Search ............ 156/79, 156/123, 250, 252, 253; 152/510; 521/918
See application file for complete search history.

(56) References Cited

U.S. PATENT DOCUMENTS

| | | | |
|---|---|---|---|
| 3,100,518 A | 8/1963 | Dresser | 152/347 |
| 3,143,155 A | 8/1964 | Knox | 153/330 |
| 4,161,202 A | 7/1979 | Powell et al. | 152/347 |
| 4,186,042 A | 1/1980 | Powell et al. | 156/115 |
| 4,210,187 A | 7/1980 | Egan | 153/347 |
| 4,399,851 A | 8/1983 | Bschorr | 152/156 |
| 4,781,774 A * | 11/1988 | Steward et al. | 156/79 |
| 5,851,323 A | 12/1998 | Kaido et al. | 152/510 |
| 5,851,324 A | 12/1998 | Oare et al. | 153/517 |
| 6,105,642 A | 8/2000 | Carson et al. | 152/203 |
| 6,720,362 B1 * | 4/2004 | Park | 521/79 |
| 2001/0036970 A1 * | 11/2001 | Park | 521/50 |

FOREIGN PATENT DOCUMENTS

| | | |
|---|---|---|
| DE | 2040898 A1 | 2/1972 |
| DE | 3042350 A1 | 5/1982 |
| EP | 367 556 B1 | 9/1990 |
| JP | 63291708 | 11/1988 |

(Continued)

OTHER PUBLICATIONS

Machine Translation for DE 3042350, May 27, 1982.*

(Continued)

*Primary Examiner*—Geoffrey L Knable
(74) *Attorney, Agent, or Firm*—Wood Herron & Evans LLP

(57) ABSTRACT

A pneumatic tire with a double layer innerliner structure bonded to an inner face of the tire carcass for reducing noise generated by air vibrations inside of the tire's air chamber, and a method of making the tire. The double layer structure includes a first innerliner layer of non-foamed rubber adjacent the carcass and a second innerliner layer of foamed porous rubber forming an innermost surface of the tire. The foamed porous rubber is formed by curing a rubber composition having a nitrogen-releasing foaming agent dispersed therein that decomposes at the vulcanization temperature to release nitrogen gas. The second innerliner layer further has an open-celled structure with a plurality of open cavities that are formed by physically altering the innermost surface of the foamed innerliner layer.

15 Claims, 1 Drawing Sheet

FOREIGN PATENT DOCUMENTS

| | | |
|---|---|---|
| JP | 2127101 | 5/1990 |
| JP | 4176705 | 6/1992 |
| JP | 4254203 | 9/1992 |
| JP | 6040206 | 2/1994 |
| JP | 2003-285607 | 10/2003 |

OTHER PUBLICATIONS

Carter et al., *Pneumatic Tire and Innerliner and Method for Manufacture*, US H2068 H, Published Jul. 1, 2003, filed Oct. 21, 1996.

European Patent Office, Search Report, Application No. 05112691.0-2425, dated Apr. 20, 2006.

\* cited by examiner

TIRE WITH DOUBLE LAYER INNERLINER

FIELD OF THE INVENTION

The present invention relates to a pneumatic tire provided with a double layer, noise-reducing innerliner, and a method of producing a pneumatic tire having a double layer innerliner designed to reduce noise.

Definitions

"Carcass" means the tire structure apart from the belt structure, tread, undertread, and sidewall rubber over the plies, but including the beads.

"Innerliner" means the layer or layers of elastomer or other material that form the inside surface of a tubeless tire and that contain the inflating fluid within the tire.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid that sustains the vehicle load.

"Tread" means a molded rubber component which, when bonded to a tire casing, includes that portion of the tire that comes into contact with the road when the tire is normally inflated and under normal load, i.e., the footprint.

The terms "cure" and "vulcanize" are intended to be interchangeable terms unless otherwise noted.

The terms "green" and "uncured" are intended to be interchangeable unless otherwise noted.

BACKGROUND OF THE INVENTION

Government regulations continue to reduce the allowable noise levels produced from the tires of passenger vehicles. One source of road noise is resonance within the air chamber enclosed by the innermost surface of the tire and the rim. One type of effort to reduce tire noise is damping the sound from the air vibration in the air chamber, which efforts have focused mainly on altering the innerliner that is disposed as the innermost layer of the tire adjacent the tire carcass. Shortcomings in these previous efforts, as well as new stricter regulations regarding noise reduction, have provided a need for further improvements to the innerliner to reduce sound transmission due to vibrations within the air chamber.

SUMMARY OF THE INVENTION

The present invention provides a pneumatic tire with a double layer innerliner structure bonded to an inner face of the tire carcass for reducing noise generated by air vibrations inside the tire's air chamber. The double layer structure includes a first innerliner layer of non-foamed rubber adjacent the carcass and a second innerliner layer of foamed porous rubber forming an innermost surface of the tire. The foamed porous rubber is cured from a rubber composition having a nitrogen-releasing foaming agent dispersed therein that decomposes upon curing to release nitrogen gas. The second innerliner layer further has an open-celled structure with a plurality of cavities physically formed in the innermost surface.

The present invention further provides a method of making a pneumatic tire having a double layer innerliner with an innermost open-cell foamed rubber layer. The method includes assembling a first green rubber innerliner layer on a green tire carcass and a second green rubber innerliner layer on the first to form a green tire assembly, wherein the first innerliner layer does not include a foaming agent therein and wherein the second innerliner layer includes a nitrogen-releasing foaming agent dispersed therein. The green tire assembly is placed in a curing mold with the second green innerliner layer furthest from the mold surface, and a curing bladder is expanded against the second green innerliner layer to press the green tire assembly into the mold surface while applying a vulcanization temperature to form a cured tire assembly. During curing at the vulcanization temperature, nitrogen gas is released upon decomposition of the foaming agent. The resulting cured tire assembly includes a non-foamed first innerliner layer adjacent the tire carcass and a foamed second innerliner layer at an innermost surface of the tire. After curing, the curing bladder is deflated and stripped from the foamed second innerliner layer. Finally, an open-cell structure is formed in the foamed second innerliner layer by physically altering the innermost surface to form a plurality of open cavities.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

In accordance with the present invention, a pneumatic tire is provided with an innerliner having a double layer structure including a non-foamed rubber layer adjacent the tire carcass and an innermost foamed rubber layer adjacent the air chamber of the tire. The foamed rubber layer dampens noise produced by air vibrations within the air chamber. In accordance with the present invention, the foamed rubber layer is a porous rubber that is cured from a rubber composition that includes a nitrogen-releasing foaming agent dispersed therein, which decomposes upon curing to release nitrogen gas to foam the rubber. In addition, the formed porous rubber has an open-cell structure comprising a plurality of open cavities that are physically formed in the innermost surface, such as by cutting the surface with a knife or perforating the surface with a laser, as described in further detail below.

Figure 1:
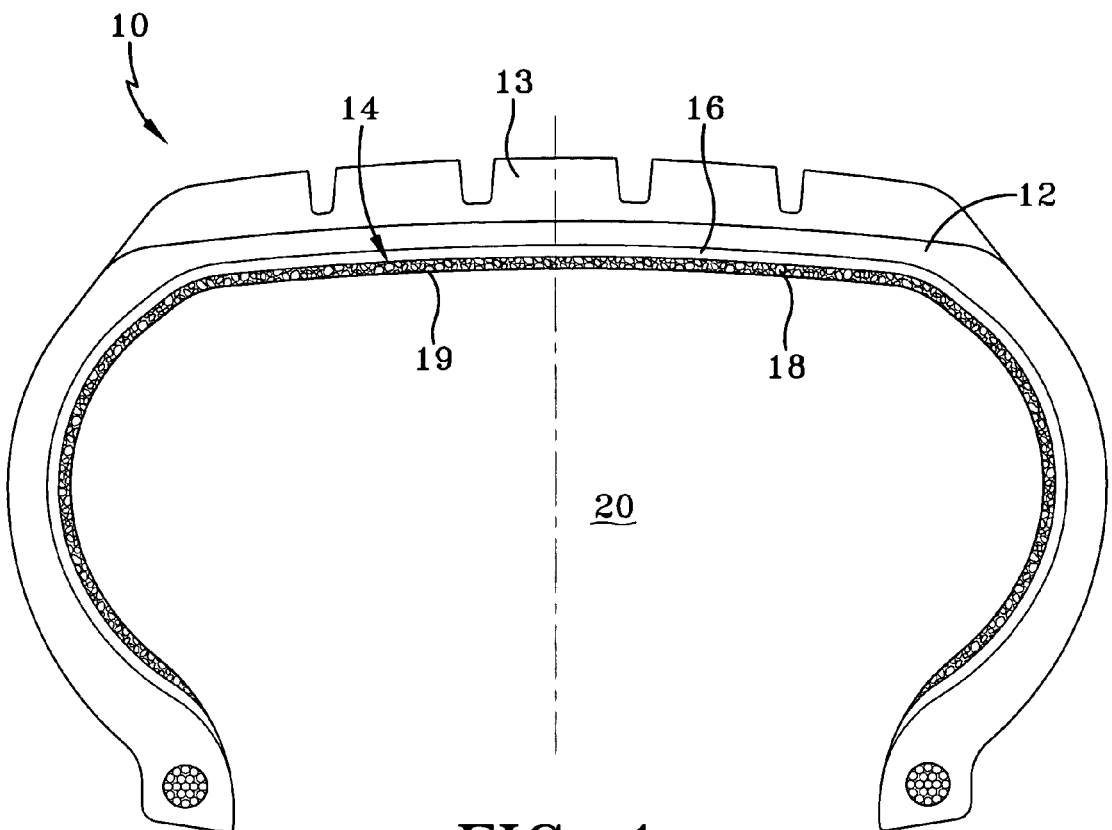
FIG. 1 is a sectional view showing an embodiment of the present invention.

FIG. 1 depicts in cross-section a tire 10 in accordance with the present invention. Tire 10 includes a carcass 12 having a tread 13 disposed on the outermost surface, which tread 13 is the portion of the tire 10 that contacts the ground during operation of the tire 10. As is known in the art, the carcass 12 may include one or more plies of cords and the carcass wraps the bead portions of the tire (not shown). An innerliner 14 is disposed inside the carcass 12 so as to face the air chamber 20. The innerliner 14 is a double layer structure that includes a first innerliner layer 16 disposed adjacent the carcass 12 and a second innerliner layer 18 disposed adjacent the first innerliner layer 16 and forming the innermost surface 19 of the tire 10 in contact with the air chamber 20. The first innerliner layer 16 is made of a non-foamed rubber and serves to prevent the air inside the air chamber 20 from escaping, thereby maintaining the air tightness of the tire 10. By way of example and not limitation, the first innerliner layer 16 may have a thickness (at the thickest point) of 0.8-2.0 mm. The first innerliner layer 16 may be made from a soft rubber composition, such as butyl rubber, halogen rubber, or the like. In an exemplary embodiment, the first innerliner layer 16 is made of a bromobutyl rubber compound. As is known in the art, the rubber compound may include various additives, such as fillers, plasticizers and curing system components.

The second innerliner layer 18 is a foamed porous rubber having an open-cell structure formed by a foaming agent and by physically altering the innermost surface 19 to provide a plurality of open cavities. The rubber compound may be the same or different than the rubber compound comprising the first innerliner 16. For example, it may also be bromobutyl rubber compound with various known additives. A foaming agent is dispersed in the rubber compound in the green state. The foaming agent is a nitrogen-releasing foaming agent that upon heating the green rubber compound at the vulcanization temperature decomposes and releases nitrogen gas to create the porous foam structure. By way of example and not limitation, the second innerliner layer 18 may have a thickness (at the thickest point) of 1-5 mm. Also by way of example and not limitation, the foaming agent may be present in the green rubber compound in an amount of 1-30 phr (parts per hundred parts of rubber). In an exemplary embodiment, the foaming agent is present in an amount of 1-8 phr. Examples of nitrogen-releasing foaming agents include azodicarbonic acid diamides (activated or non-activated); sulfohydrazides, such as p-toluenesulfohydrazide (TSH); dinitrosopentamethylene tetramine (DNPT); triazole derivatives; and azoisobutyric dinitrile or similar compounds. Examples of commercially available foaming agents include: POROFOR® TSH from Bayer Chemicals; SAFOAM® from AMCO Plastic Materials, Inc.; CEL-SPAN® from Phoenix Plastics Co.; and DNPT from Standard Chemical Industries.

To form the tire 10, the method of the present invention includes assembling the first innerliner layer in a green state, i.e., an uncured state, adjacent a green tire carcass, and assembling the second innerliner layer in a green state onto the first innerliner layer. A green tread strip is assembled adjacent the outermost surface of the tire carcass. These layers may be assembled in any desired order. This green tire assembly is then placed into a curing mold such that the green tread strip is positioned against the mold surface, and the second innerliner layer is furthest from the mold surface so as to form the innermost layer. An expandable curing bladder is expanded against the second innerliner layer to press the green tire assembly into the mold surface to press the green tread strip into a tread pattern formed in the mold surface. A vulcanization temperature is applied in the mold while the tire assembly is subjected to the pressure from the expanded curing bladder for a time sufficient to cure the tire assembly. During the curing process at the vulcanization temperature, the foaming agent in the second innerliner layer 18 decomposes to release nitrogen gas thereby foaming the rubber as it cures, such that the second innerliner layer 18 in the cured tire 10 is a foamed rubber. The first innerliner layer 16 adjacent the carcass 12 does not include a foaming agent therein, and is thus a non-foamed rubber layer.

Figure 2:
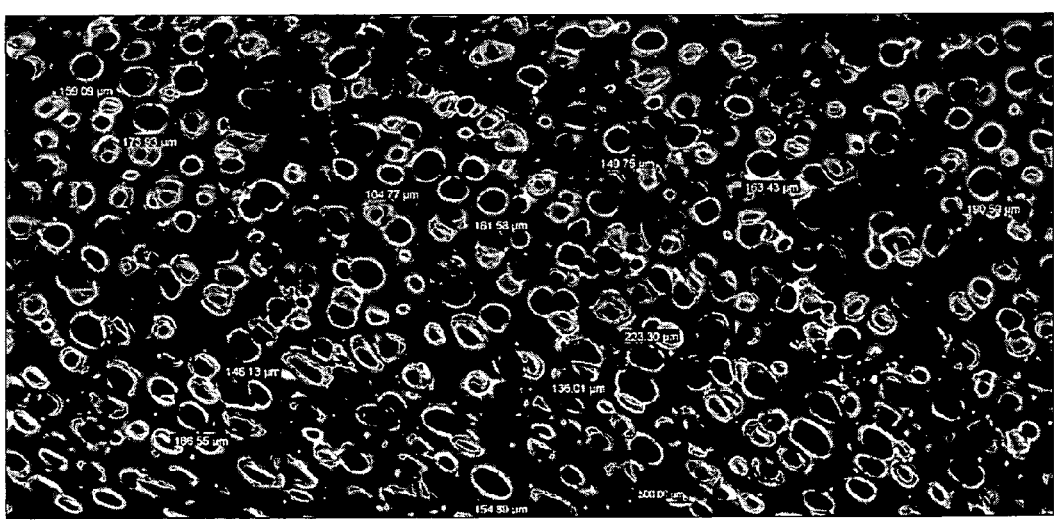
FIG. 2 is a micrograph depicting the open-cell structure of the foamed innerliner layer in accordance with an embodiment of the present invention.

After curing is completed, the curing bladder is deflated and stripped from the foamed second innerliner layer 18. By virtue of the dimensional variation in the second innerliner layer 18 created by the foaming, stripping of the curing bladder from the innerliner 14 is easier than stripping a curing bladder from a non-foamed rubber layer. This is an additional benefit of the present invention. While some open-cell structure may be observed in the second innerliner layer 18 after removal of the curing bladder, the dimensions of any open cells are extremely small, such as on the order of 10 microns or less mean diameter, and the degree of noise dampening achieved by this structure is insufficient to meet current noise reduction requirements. Thus, in accordance with the present invention, the second innerliner layer 18 is treated to physically alter the innermost surface 19 to form a plurality of open cavities, as seen in FIG. 2. By this physical alteration, a larger number of open cavities are obtained, and the dimensions of the open cavities are significantly larger than any open cells that may be produced simply by the foaming process. In one embodiment of the present invention, after the physical alteration of the innermost surface 19, the plurality of open cavities have a mean diameter of about 50-250 μm. In another embodiment of the present invention, the plurality of open cavities have a mean diameter of about 130-200 μm.

In accordance with one embodiment of the present invention, the physical alteration of the innermost surface 19 is performed by a knife cutting operation to cut or scratch the surface of the foamed second innerliner layer 18 to open up the cell structure. In accordance with another embodiment of the present invention, the method for opening the cells is hole-burning with a laser. A pulsed laser may be used to scan the innermost surface 19 to perforate the surface with holes of a constant or variable distance. For example, the pulsed laser may be operated at a pulse rate of 20 kHz. In one embodiment, the pulse rate may be increased to the point of being essentially continuous, whereby the innermost surface 19 is essentially depleted or removed to a controlled depth, thereby opening holes in the cell structure closest to the air chamber 20. The nature of the rubber compounds used for tire innerliners prevents or severely limits the formation of the open cells in a foam rubber structure. Thus, the noise dampening provided by the foamed rubber innerliner without any physical treatment is limited. However, in accordance with the present invention, a physical step is carried out to open up the cell structure, which structure cannot be achieved solely by the foaming agent. As a result of the large number of large open cavities present at the innermost surface 19, a greater reduction in the noise resulting from air vibrations inside the air chamber 20 of the tire is achieved.

EXAMPLE

The following test compounds N1-N4 were prepared for use as the second innerliner layer 18 in the tire 10 of the present invention:

| | Test N1 | Test N2 | Test N3 | Test N4 |
|---|---|---|---|---|
| Non-Productive Mixing | | | | |
| Exxonmobil Bromobutyl 2222 (parts by weight) | 112.3 | 112.3 | 112.3 | 112.3 |
| N550/FEF carbon black (phr) | 50 | 50 | 50 | 50 |
| Naphthenic medium process oil (phr) | 6.75 | 6.5 | 6 | 5 |
| Non staining, unreactive, 100% octyl phenol formaldehyde resin (phr) | 1 | 1 | 1 | 1 |
| Stearic acid (phr) | 2 | 2 | 2 | 2 |
| Mixture of alkylated naphthenic and aromatic resins (phr) | 10 | 10 | 10 | 10 |
| Discharge T (° C.) | 145 | 140 | 143 | 144 |

-continued

|  | Test N1 | Test N2 | Test N3 | Test N4 |
|---|---|---|---|---|
| Productive Mixing |  |  |  |  |
| N-tertbutyl-2-benzothiazole-sulfenamide (TBBS) (phr) | 0.5 | 0.5 | 0.5 | 0.5 |
| Non treated French Process Zinc Oxide (phr) | 2 | 2 | 2 | 2 |
| Sulfur (phr) | 0.5 | 0.5 | 0.5 | 0.5 |
| Foaming Agent[1] (phr) | 1 | 2 | 4 | 8 |
| Discharge T (° C.) | 95 | 90 | 87 | 90 |
| Total | 186.05 | 186.8 | 188.3 | 191.3 |

[1]POROFOR ® TSH 75 from Bayer Chemicals.

The foaming agent used, a p-toluenesulfonhydrazide, begins to decompose at 120° C., such that care must be taken during the productive mixing step to obtain a discharge temperature not exceeding 100-120° C. The N4 test compound, which contained 8 phr of the foaming agent, showed a particularly well-foamed compound. The open cell structure was then obtained by physically scratching the cured compound with a knife. The resulting innerliner layer having a plurality of open cavities of mean diameter 164.2 µm (+/−30.2) is depicted in the micrograph of FIG. 2.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope of the general inventive concept.

What is claimed is:

1. A pneumatic tire comprising a carcass and an innerliner bonded to an inner face of the carcass, said innerliner comprising a double layer structure including a first innerliner layer of non-foamed rubber adjacent the carcass and a second innerliner layer of in situ-foamed porous rubber forming an innermost surface of the tire with a chemical bond between the first and second innerliner layers, wherein the first innerliner layer is cured from a green composition and the second innerliner layer of in situ-foamed porous rubber is cured from a green composition comprising a nitrogen-releasing foaming agent that decomposes upon curing of the tire in a mold to release nitrogen gas, wherein the chemical bond is formed between the first and second innerliner layers upon co-curing of their respective green compositions, and wherein the second innerliner layer has a post-cure physically altered innermost surface having a plurality of open cavities physically formed therein after curing the tire in the mold by one of knife cutting alteration or a laser perforation alteration, and wherein the plurality of open cavities have a mean diameter of about 50-250 µm.

2. The pneumatic tire of claim 1 wherein the plurality of open cavities have a mean diameter of about 130-200 µm.

3. A method of making a pneumatic tire, comprising:
assembling a first green innerliner layer on a green tire carcass and a second green innerliner layer on the first green innerliner layer to form a green tire assembly, wherein the second green innerliner layer comprises a second rubber compound and a nitrogen-releasing foaming agent dispersed therein, and wherein the first green innerliner layer comprises a first rubber compound without a foaming agent therein;
placing the green tire assembly in a curing mold with the second green innerliner layer furthest from the mold surface;
expanding a curing bladder against the second green innerliner layer to press the green tire assembly into the mold surface while applying a vulcanization temperature in the mold, wherein nitrogen gas is released upon decomposition of the foaming agent in the green second innerliner layer to form a cured tire assembly comprising a non-foamed first innerliner layer adjacent the tire carcass and a foamed second innerliner layer at an innermost surface of the tire;
deflating the curing bladder and stripping the curing bladder from the foamed second innerliner layer; and
thereafter, forming an open-cell structure in the innermost surface of the foamed second innerliner layer by physically altering the innermost surface by one of cutting the innermost surface with a knife to open a cellular structure of the foamed second innerliner layer or perforating the innermost surface with a laser, to form a plurality of open cavities, wherein the physically altering forms the plurality of open cavities with a mean diameter of about 50-250 µm.

4. The method of claim 3 wherein the nitrogen-releasing foaming agent is an azodicarbonic acid diamide, a sulphohydrazide, dinitrosopentamethylene tetramine, a triazole derivative, or azoisobutyric dinitrile.

5. The method of claim 3 wherein the nitrogen-releasing foaming agent is p-toluenesulfohydrazide.

6. The method of claim 3 wherein first and second rubber compounds are identical in composition.

7. The method of claim 3 wherein the altering forms the plurality of open cavities with a mean diameter of about 130-200 µm.

8. The method of claim 3 wherein the nitrogen-releasing foaming agent is dispersed in the second green innerliner layer in an amount of 1-30 phr.

9. A method of making a pneumatic tire, comprising:
assembling a first green innerliner layer on a green tire carcass and a second green innerliner layer on the first green innerliner layer to form a green tire assembly, wherein the second green innerliner layer comprises a second rubber compound and a nitrogen-releasing foaming agent dispersed therein, and wherein the first green innerliner layer comprises a first rubber compound without a foaming agent therein;
placing the green tire assembly in a curing mold with the second green innerliner layer furthest from the mold surface;
expanding a curing bladder against the second green innerliner layer to press the green tire assembly into the mold surface while applying a vulcanization temperature in the mold, wherein nitrogen gas is released upon decomposition of the foaming agent in the green second innerliner layer to form a cured tire assembly comprising a non-foamed first innerliner layer adjacent the tire carcass and a foamed second innerliner layer at an innermost surface of the tire;
deflating the curing bladder and stripping the curing bladder from the foamed second innerliner layer; and
thereafter, forming an open-cell structure in the innermost surface of the foamed second innerliner layer by physically altering the innermost surface by scanning the innermost surface with a pulsed laser, to perforate the innermost surface thereby forming a plurality of open cavities with a mean diameter of about 50-250 μm.

10. The method of claim 9 wherein the innermost surface is scanned with a pulsed laser operating at a pulse rate of 20 kHz.

11. The method of claim 9 wherein the nitrogen-releasing foaming agent is an azodicarbonic acid diamide, a sulphohydrazide, dinitrosopentamethylene tetramine, a triazole derivative, or azoisobutyric dinitrile.

12. The method of claim 9 wherein the nitrogen-releasing foaming agent is p-toluenesulfohydrazide.

13. The method of claim 9 wherein first and second rubber compounds are identical in composition.

14. The method of claim 9 wherein the altering forms the plurality of open cavities with a mean diameter of about 130-200 μm.

15. The method of claim 9 wherein the nitrogen-releasing foaming agent is dispersed in the second green innerliner layer in an amount of 1-30 phr.

* * * * *